United States Patent [19]

Scott

[11] 4,298,892
[45] Nov. 3, 1981

[54] SWITCHING REGULATOR WITH INDEPENDENT FEEDBACK PATH FILTER

[75] Inventor: Howard M. Scott, Moorestown, N.J.

[73] Assignee: RCA Corporation, New York, N.Y.

[21] Appl. No.: 153,398

[22] Filed: May 27, 1980

Related U.S. Application Data

[63] Continuation of Ser. No. 969,156, Dec. 13, 1978.

[51] Int. Cl.³ .............................................. H04N 3/18
[52] U.S. Cl. .................................. 358/190; 307/150;
    323/286; 328/258; 455/343
[58] Field of Search ......................... 358/190; 307/150;
    323/9; 328/258, 261, 267; 455/343

[56] References Cited

U.S. PATENT DOCUMENTS

| | | | |
|---|---|---|---|
| 3,873,846 | 3/1975 | Morio et al. | 358/190 |
| 3,931,567 | 1/1976 | Kostecki | 358/190 |
| 4,118,739 | 10/1978 | Umehara | 358/190 |

FOREIGN PATENT DOCUMENTS 1090333  11/1967  United Kingdom .

OTHER PUBLICATIONS

R. J. Apfel, "Regulators To Switch or Not?", *Electronics Products Magazine*, pp. 39–45, Aug. 1977.
S. Wahnfried, "Pulse-controlled Constant Voltage Device", *Elektronic*, No. 11, pp. 359–360, 1968.
"The Control Transistor In Switching", *AEG-Mitteilungen* 50, 1960.

*Primary Examiner*—Richard Murray
*Attorney, Agent, or Firm*—Paul J. Rasmussen; William H. Meise

[57] ABSTRACT

A switching regulator for a television display apparatus includes a controllable switch coupled to a source of unregulated direct voltage. The switch is operated at the deflection rate to produce a pulsating direct voltage. A filter including a series choke and a shunt capacitor has its input coupled to the switch for filtering the pulsating direct voltage to form a direct voltage for operating the television display apparatus. An integrator has its input coupled to the input of the filter for averaging the pulsating direct voltage.

A feedback voltage control circuit has an input coupled to the integrator and an output coupled to a control electrode of the controllable switch for maintaining the average of the pulsating direct voltage constant over a wide range of unregulated direct voltage and load current variations.

9 Claims, 2 Drawing Figures

SWITCHING REGULATOR WITH INDEPENDENT FEEDBACK PATH FILTER

This is a continuation of application Ser. No. 969,156, filed Dec. 13, 1978.

BACKGROUND OF THE INVENTION

This invention relates to switching regulators suitable for use in television applications.

Self-oscillating switching regulators include a power switching device coupled to a source of unregulated direct voltage. The switching device is gated on and off by a control circuit to produce a pulsating direct voltage. A series inductor and shunt capacitor are coupled to the pulsating direct voltage of averaging the pulsations to produce a direct voltage for application to the load to be energized. The control circuit conventionally compares a sample of the direct load voltage with a reference voltage to produce a switch control signal. When the load voltage decreases, the switch is turned on in order to increase the load voltage, and when the load voltage is too high the switch is turned off so that the load voltage may decrease. Stability of such regulators may be assured by a hysteresis function of the control circuit. In such switching regulators, the output voltage level is proportional to the duty cycle of the switch. Thus, the duty cycle tends to vary with changes in the unregulated direct voltage to maintain a constant regulated voltage. With increasing load current, the filter capacitor tends to be discharged more quickly, and the repetition rate of the regulator tends to rise. A particular disadvantage of such prior art regulators is that the ripple of the output voltage is used to drive the comparator, and therefore the output ripple does not decrease at small output currents.

When used for television applications, it is desirable to synchronize the switching of a switching type regulator with the horizontal deflection so as to eliminate apparent motion on the television screen of transients caused by switching of the regulator. Consequently, the repetition rate of the regulator is held constant, and only duty cycle variations are available to control the voltage to be regulated. In normal operation, a television receiver can be expected to have considerable variations in its current demand, resulting primarily from changes in average kinescope beam current. These changes in load current load the regulator and because the synchronized repetition rate is fixed result in changes in the waveshape of the voltage across the filter capacitor. These changes tend to unsynchronize the regulator by increasing the natural repetition rate or frequency to a value above the synchronizing frequency.

SUMMARY OF THE INVENTION

A switching regulator for use with a television display apparatus and adapted to be energized from a source of unregulated direct voltage includes a controllable switch having a control electrode and a main current conducting path. The main current conducting path defines first and second terminals. The first terminal is coupled to a terminal of the source of unregulated voltage. A filter including a choke is coupled to the second terminal of the switch and in cascade to a portion of the television apparatus for energizing the portion with a substantially constant voltage. A voltage control circuit is coupled to the control electrode of the switch and to the second terminal of the main current conducting path for controlling the switching time to maintain the average voltage at the second terminal at a substantially constant value.

DESCRIPTION OF THE INVENTION

Figure 1:
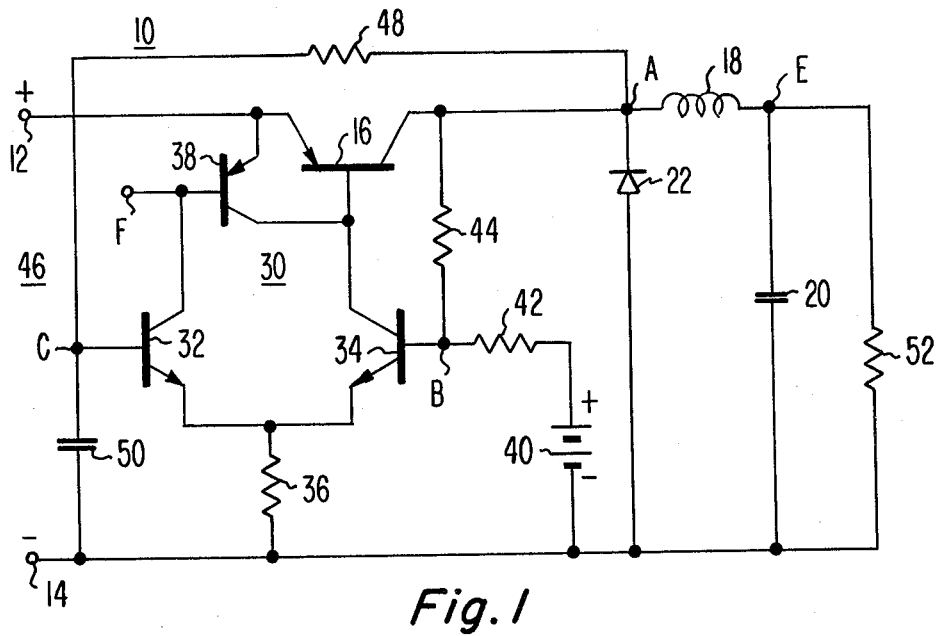
FIG. 1 is a schematic diagram of an embodiment of the invention.

In FIG. 1 a switching regulator circuit designated generally as 10 includes terminals 12 and 14 adapted to be connected to a source of unregulated direct voltage (not shown) such as a rectifier and filter capacitor coupled to the alternating-current power mains. Regulator 10 includes a PNP power switching transistor 16 having its emitter coupled to terminal 12. The collector of transistor 16 is connected at a circuit point A to a filter inductor 18. The end of inductor 18 remote from point A is connected at a circuit point E to one end of a filter capacitor 20, the other end of which is connected to terminal 14 (hereinafter referred to as "ground"). The direct output voltage to be regulated appears between point E and ground. A commutating or flywheel diode 22 has its cathode connected to point A and its anode connected to ground.

A control circuit designated generally as 30 includes a differential comparator including emitter-coupled NPN transistors 32 and 34, the emitters of which are joined and coupled to ground by means of a resistor 36. The collector of transistor 34 is connected to the base of transistor 16. The collector of transistor 32 is connected at a circuit point F to the base of a PNP transistor 38, the collector-emitter conducting path of which is connected between the base and emitter of transistor 16. The base of transistor 34 is coupled to a reference voltage source illustrated as a battery 40 by way of a circuit point B and a resistor 42. Resistor 42 together with a resistor 44 connected between points A and B provides a hysteresis characteristic to the comparator. The base of transistor 32 is coupled at a circuit point C to an integrating network designated generally as 46 and including a resistor 48 and a capacitor 50. The input of integrating circuit 46 is coupled to point A. A load represented as a resistor 52 is coupled across capacitor 20.

Figure 2:
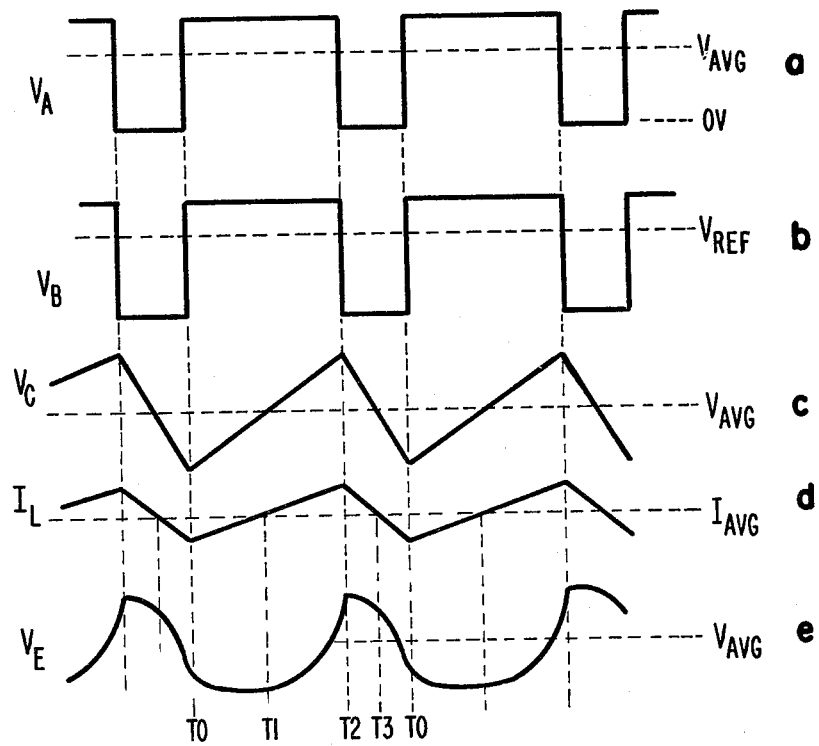
FIG. 2 illustrates amplitude-time graphs of voltages and currents occurring in the apparatus of FIG. 1 during operation.

In operation immediately prior to a time T0 as illustrated in FIG. 2, transistors 32 and 38 are conductive and transistor 34 is nonconductive. Transistor 16 is therefore nonconductive and diode 22 conducts to supply the current demand of inductor 18. Circuit point A is nominally at ground potential as illustrated by VA in FIG. 2a. The voltage at point B available as a reference for comparator 30 is less than (negative with respect to) the voltage of battery 40, as illustrated by VB in FIG. 2b. Capacitor 50 is discharging through resistor 48 towards the nominal ground potential at circuit point A, and produces a decreasing ramp voltage VC at circuit point C as illustrated in FIG. 2c. Capacitor 20 is charged to the output voltage VE applied across load 52, and the current in inductor 18 is decreasing as illustrated by IL of FIG. 2d as a portion of the energy stored in its magnetic field is transferred to capacitor 20. The average current flow through choke or inductor 18 required to maintain the regulated voltage constant must equal the current drain of load 52. The current drawn from capacitor 20 by load 52 exceeds that available from inductor 18, and the voltage VE at circuit point E is decreasing, as illustrated by VE in FIG. 2e. FIG. 2e illustrates only the alternating or ripple component of VE.

Near time T0, the decreasing ramp voltage at point C becomes equal to and then slightly less than the voltage at circuit point B, whereupon comparator 30 switches, making transistors 32 and 38 nonconductive and transistor 34 conductive. With transistor 34 conductive and transistor 38 nonconductive, base current is supplied to transistor 16, saturating transistor 16 and raising voltage VA at circuit point A to a value greater (more positive) than voltage VE. The increase in voltage VA raises the voltage at circuit point B to a value slightly greater than the voltage of battery 40 and also greater than the voltage then appearing at point C, thereby guaranteeing that transistor 34 remains conductive to the exclusion of transistor 32. Diode 22 becomes nonconductive, and the current IL in inductor 18 begins to increase, as illustrated in FIG. 2d. After time T0, the increase in voltage VA causes a positive-going ramp portion of voltage VC to be generated at circuit point C as capacitor 50 begins to charge through resistor 48. However, in the interval between time T0 and T1 the current IL in inductor 18, although increasing, continues to be less than the current drawn by load 52, and the difference is supplied by discharge of capacitor 20. Consequently, voltage VE across capacitor 20 continues to decrease in the interval T0-T1, albeit the discharge is slow near time T1. At time T1, the current in inductor 18 equals the current drain of load circuit 52. At time T1, there is no net current flow in capacitor 20, and it therefore neither charges nor discharges.

In the interval T1-T2, the current flow in inductor 18 exceeds the average current demand of the load, and voltage VE consequently increases. At times near time T2, current IL significantly exceed the load demand, and a relatively large current is available to charge capacitor 20 at a rapid rate.

Near time T2, the increasing ramp voltage VC at circuit point C becomes equal to and slightly exceeds the voltage then applied to the comparator at circuit point B. At time T2, comparator 30 switches, transistors 32 and 38 becoming conductive and transistor 34 nonconductive. Residual collector current of transistor 34 is prevented from flowing through the base-emitter junction of transistor 16 by the conduction of transistor 38. Consequently, transistor 16 is cut off and the energy associated with the magnetic field of inductor 18 drives the voltage at point A sharply negative. Diode 22 becomes conductive, limiting the negative-going excursion at point A to 1 VBe below ground. With point A at nominal ground, the voltage at circuit point B decreases to a value less than that of battery 40, thereby guaranteeing that transistors 32 and 38 remain conducting and transistor 34 remains nonconducting. Capacitor 50 begins to form a negative-going ramp voltage at circuit point C as it discharges through resistor 48. Ramp voltage VC and output voltage VE continue to decrease until VC intersects VB, the comparator again switches and the cycle repeats.

As so far described, regulator 10 is free-running. Synchronization of regulator 10 is accomplished by applying negative-going pulses to circuit point F. A negative-going pulse at circuit point F forward-biases transistor 38, thereby turning off transistor 16 and establishing time T2 as a reference. So long as the natural self-oscillation time of regulator 10 is greater than the time interval between synchronizing pulses, the regulator will remain synchronized. The increase in frequency due to synchronizing in the forced repetition rate or frequency over the natural repetition rate of the oscillator tends to reduce the duty cycle of switch 16, thereby tending to reduce the average output voltage. The tendency to a low average voltage at point A is coupled by integrator 46 to point C, and tends to maintain transistor 32 off for a longer portion of the available interval. Consequently, transistor 34 tends to turn on for a longer portion of the available interval, counteracting by feedback action the tendency to a lower output voltage. The output voltage at circuit point E has substantially the same average voltage as circuit point A, subject only to the small IR drop in inductor 18. The duty cycle of the regulator switch after synchronization will be the same as the free-running duty cycle for the same output voltage.

The arrangement according to invention provides improved stability during synchronized operation as compared with prior-art arrangements, by eliminating load-current dependent changes in the voltage sample applied to the comparator which tend to increase the natural repetition rate. The arrangement according to the invention has the additional advantage that the magnitude of the AC ripple voltage superimposed upon the regulator direct output voltage is reduced at low load currents, because the comparator is not driven from the output.

Other embodiments of the invention will be apparent to those skilled in the art. For example, reference voltage source 40 may be constituted as a zener diode rather than as a battery. Any of a number of comparator arrangements may be used, and capacitor 20 may be referenced to terminal 12 rather than terminal 14. The polarities of the transistors and diode may be reversed for oppositely poled unregulated direct voltage.

What is claimed is:

1. A switching regulator adapted for synchronized operation with a television display load apparatus and adapted to be energized from a source of unregulated direct voltage, comprising:

controllable switch means including a control electrode and a main current conducting path defining first and second terminals, said first terminal being coupled to a terminal of the source, said controllable switch means being subject to switching between on and off states to develop at said second terminal an alternating voltage having an average voltage component;

a filter including a choke coupled to said second terminal of said switch means and a capacitor coupled to the load apparatus for energizing said load apparatus with a substantially direct current voltage having a magnitude substantially that of said average voltage component;

a source of a television display horizontal deflection rate sync signal;

means for applying said television display sync signal to said controllable switch means to switch the state of said controllable switch means from a selected one of said on and off states to the other of said on and off states in coincidence with the arrival of said sync signal;

a comparator with a plurality of input terminals and a first output terminal coupled to said control electrode for switching states of said controllable switch means;

a reference voltage source coupled to one of said plurality of comparator input terminals; and an integrator having an input terminal coupled to said second terminal and an output terminal coupled to one of said plurality of comparator input terminals for averaging said alternating voltage to vary the switching instant of said controllable switch means to the other one of said on and off states so as to maintain said average voltage component substantially unchanged with changes in said unregulated direct voltage.

2. A switching regulator for a television display apparatus adapted to be energized from a source of unregulated direct voltage, comprising:

controllable switch means including a control electrode and a main controlled current path coupled to the source;

a source of a horizontal deflection rate sync signal;

means responsive to said sync signal for switching conductive states of said controllable switch means to produce a pulsating direct voltage repeating at said horizontal deflection rate;

filter means including an input choke coupled to said switch means for filtering said pulsating direct voltage to form an operating voltage for the apparatus;

an integrator coupled to said input choke of said filter means for generating a control signal related to said pulsating direct voltage; and negative feedback means coupled to said integrator and to said control electrode and responsive to said control signal for controlling the duty cycle of said switch means to maintain said operating voltage substantially constant.

3. A synchronized switching regulator for a television display apparatus adapted to be energized from a source of unregulated direct voltage, comprising:

controllable switch means including a control electrode and a main controlled current path coupled to the source;

means for applying a horizontal sync signal to said control electrode to produce a pulsating direct voltage synchronized with horizontal deflection;

series inductance means coupled to said main current path and to the apparatus for producing direct current for energizing said apparatus from said pulsating direct voltage; and feedback voltage control means coupled to the juncture of said inductance means and said switch means and to said control electrode for varying the duty cycle of said synchronized pulsating direct voltage to maintain the average value of said pulsating direct voltage substantially constant over a wide range of unregulated direct voltages.

4. A regulator according to claim 1 wherein said selected one state comprises the on-state.

5. A regulator according to claims 1 or 4 wherein said comparator in the absence of said sync signal switches states of said controllable switch both from the on-state to the off-state and from the off-state to the on-state in a free-running mode of operation at a frequency less than the horizontal deflection frequency under normal, steady-state loading by said television display load apparatus.

6. A regulator according to claim 5 including means for applying said alternating voltage to one of said plurality of comparator input terminals to provide hysteresis to the comparator operation.

7. A regulator according to claim 6 wherein said comparator comprises first and second transistors arranged as a differential comparator, a collector electrode of said first transistor comprising said comparator first output terminal.

8. A regulator according to claim 7 including a flywheel diode coupled to said choke and wherein said controllable switch means comprises a switching transistor.

9. A regulator according to claim 8 wherein said television display sync signal applying means comprises a third transistor having a collector-to-emitter path coupled across the base-to-emitter path of said switch means and having an input terminal coupled to the collector of said second transistor and wherein said sync signal is applied to an input terminal of said third transistor.

* * * * *